United States Patent
Chaifetz et al.

(10) Patent No.: US 9,315,382 B2
(45) Date of Patent: Apr. 19, 2016

(54) METAL CHLORIDES AND METALS OBTAINED FROM METAL OXIDE CONTAINING MATERIALS

(75) Inventors: Richard I. Chaifetz, Silverspring, MD (US); Gregory William Matusewitch, Concord, OH (US); Corey Clague Morton, Concord, OH (US); Jason Michael Phillips, Chardon, OH (US)

(73) Assignee: KEYSTONE METALS RECOVERY INC., Columbia, MD (US)

( * ) Notice: Subject to any disclaimer, the term of this patent is extended or adjusted under 35 U.S.C. 154(b) by 229 days.

(21) Appl. No.: 11/386,852

(22) Filed: Mar. 23, 2006

(65) Prior Publication Data
US 2007/0224109 A1  Sep. 27, 2007

(51) Int. Cl.
| | |
|---|---|
| *C01B 9/02* | (2006.01) |
| *B01J 8/00* | (2006.01) |
| *C01G 1/06* | (2006.01) |
| *C01G 23/02* | (2006.01) |
| *C01G 49/10* | (2006.01) |
| *C25C 3/06* | (2006.01) |

(52) U.S. Cl.
CPC ... *C01B 9/02* (2013.01); *C01G 1/06* (2013.01); *C01G 23/022* (2013.01); *C01G 49/10* (2013.01); *C25C 3/06* (2013.01); *B01J 2219/00006* (2013.01)

(58) Field of Classification Search
USPC .................. 423/111, 135, 136, 137, 495, 496
See application file for complete search history.

(56) References Cited

U.S. PATENT DOCUMENTS

| | | |
|---|---|---|
| 1,545,383 A | 7/1925 | Ashcroft |
| 1,545,384 A | 7/1925 | Ashcroft |
| 1,569,606 A | 1/1926 | Ashcroft |
| 1,943,341 A | 1/1934 | Mitchell et al. |
| 2,048,987 A | 7/1936 | Atherholt |
| 2,084,289 A | 6/1937 | McAfee |
| 2,084,290 A | 6/1937 | McAfee |
| 2,141,444 A | 12/1938 | Nordberg |
| 2,194,443 A | 3/1940 | Hardy et al. |
| 2,387,228 A | 10/1945 | Arnold |
| 2,408,241 A | 9/1946 | Sturbelle |
| 2,580,635 A | 1/1952 | Winter, Jr. |
| 2,583,013 A | 1/1952 | Patterson |
| 2,718,279 A | 9/1955 | Kraus |
| 2,813,786 A | 11/1957 | Milliken, Jr. |
| 2,824,050 A | 2/1958 | Marcot et al. |
| 2,849,293 A | 8/1958 | Wendell, Jr. et al. |

(Continued)

FOREIGN PATENT DOCUMENTS

| | | |
|---|---|---|
| DE | 215769 A1 | 11/1984 |
| GB | 2145401 A | 3/1985 |

OTHER PUBLICATIONS

Hawley's Condensed Chemical Dictionary, Fifteen edition, 2207, p. 245.*

(Continued)

*Primary Examiner* — Ngoc-Yen Nguyen
(74) *Attorney, Agent, or Firm* — Greenblum & Bernstein, P.L.C.

(57) ABSTRACT

Method and apparatus for preparing at least one metal chloride from metal oxide containing material comprising calcining the metal oxide containing material under temperature conditions sufficient to obtain a calcined product comprising at least one metal oxide; and selectively chlorinating the calcined product to form at least one metal chloride.

18 Claims, 7 Drawing Sheets

(56) References Cited

U.S. PATENT DOCUMENTS

| | | | |
|---|---|---|---|
| 3,101,249 A | 8/1963 | Priscu | |
| 3,443,360 A | 5/1969 | Reeves | |
| 3,466,169 A | 9/1969 | Nowak et al. | |
| 3,616,438 A | 10/1971 | Foley et al. | |
| 3,694,170 A | 9/1972 | Koichi Fujii et al. | |
| 3,760,066 A | 9/1973 | Calcagno et al. | |
| 3,785,941 A | 1/1974 | Jacobs | |
| 3,786,135 A | 1/1974 | King et al. | |
| 3,799,746 A | 3/1974 | Underwood, Jr. | |
| 3,816,093 A | 6/1974 | Hildreth | |
| 3,822,195 A | 7/1974 | Dell et al. | |
| 3,842,163 A | 10/1974 | Russel et al. | |
| 3,848,051 A | 11/1974 | Mas et al. | |
| 3,862,293 A | 1/1975 | Maurel et al. | |
| 3,956,454 A | 5/1976 | Nemecz et al. | |
| 4,073,872 A | 2/1978 | Willhoft | |
| 4,083,927 A * | 4/1978 | Wyndham | 423/136 |
| 4,086,320 A * | 4/1978 | Martin et al. | 423/135 |
| 4,096,234 A * | 6/1978 | Martin et al. | 423/135 |
| 4,105,752 A | 8/1978 | Becker et al. | |
| 4,106,928 A | 8/1978 | Harvey, II et al. | |
| 4,110,178 A | 8/1978 | LaCamera et al. | |
| 4,111,764 A | 9/1978 | Stoehr et al. | |
| 4,220,629 A * | 9/1980 | Wyndham et al. | 423/76 |
| 4,252,774 A | 2/1981 | Loutfy et al. | |
| 4,252,777 A * | 2/1981 | McDowell et al. | 423/111 |
| 4,259,106 A | 3/1981 | Aaltonen et al. | |
| 4,277,446 A | 7/1981 | Weston | |
| 4,288,414 A | 9/1981 | Reynolds et al. | |
| 4,289,735 A | 9/1981 | Mueller et al. | |
| 4,310,495 A | 1/1982 | Bonsack | |
| 4,334,898 A | 6/1982 | Zhuber-Okrog et al. | |
| 4,349,420 A | 9/1982 | Stewart, Jr. | |
| 4,355,007 A | 10/1982 | Dunn, Jr. | |
| 4,355,008 A | 10/1982 | Dunn, Jr. | |
| 4,363,789 A * | 12/1982 | Dunn, Jr. | 423/79 |
| 4,400,247 A | 8/1983 | Ginatta | |
| 4,425,308 A | 1/1984 | Weston | |
| 4,425,309 A | 1/1984 | Weston | |
| 4,425,310 A | 1/1984 | Weston | |
| 4,478,600 A | 10/1984 | Schoener et al. | |
| 4,514,373 A | 4/1985 | Wyndham | |
| 4,519,987 A | 5/1985 | Robinson | |
| 4,536,212 A * | 8/1985 | Weston | 75/674 |
| 4,541,907 A | 9/1985 | Culleiton et al. | |
| 4,563,338 A | 1/1986 | Séon et al. | |
| 4,593,755 A | 6/1986 | Rogers, Jr. | |
| 4,661,328 A | 4/1987 | Grubbs | |
| 4,695,436 A | 9/1987 | Wyndham et al. | |
| 4,699,770 A * | 10/1987 | Weston | 423/135 |
| 4,959,202 A | 9/1990 | Minet et al. | |
| 5,032,372 A | 7/1991 | Bonsack | |
| 5,063,032 A | 11/1991 | Gueguin | |
| 5,104,445 A | 4/1992 | Dubrovsky et al. | |
| 5,389,353 A | 2/1995 | Glaeser et al. | |
| 5,670,121 A | 9/1997 | Elkins | |
| 6,030,433 A | 2/2000 | Luggenhorst et al. | |
| 6,808,695 B1 | 10/2004 | Chaplin | |
| 6,905,662 B2 | 6/2005 | Raahauge | |
| 6,921,474 B2 | 7/2005 | Vandenhaute et al. | |
| 6,955,703 B2 | 10/2005 | Zhou et al. | |
| 6,995,703 B2 | 2/2006 | Kobayashi | |
| 2001/0053339 A1 | 12/2001 | Kohler et al. | |
| 2003/0164067 A1 | 9/2003 | Chaplin | |
| 2005/0006247 A1 | 1/2005 | Vandenhaute et al. | |
| 2005/0135991 A1 | 6/2005 | Engle et al. | |

OTHER PUBLICATIONS

Landsberg, Metallurgical Transactions B, vol. 6B, Jun. 1975, pp. 207-214.
Ko et al., Metallurgical Transactions B, vol. 17B, No. 3, Sep. 1986, pp. 609-610.
Landsberg, Metallurgical Transactions B, vol. 8B, Sep. 1977, pp. 435-441.
Landsberg et al., Metallurgical Transactions B, vol. 16B, Dec. 1985, pp. 847-849.
Landsberg, "Phosgene-Rutile Reaction at 500-1100 ° C. in a small Tapered Fluidized Bed", Study conducted by the Albany Research Center of the Bureau of Mines, Albany, OR, (p. 2 missing).
Landsberg, "Aluminum from Domestic Clay via Chloride Process", 1983, U. S. Department of the Interior—Bureau of Mines; 8923.
Imperial et al., "Removal of Mineral Matter from Anthracite by Chlorination at High Temperatures", Special Research Report, Jun. 22, 1959, College of Mineral Industries, Pennsylvania State University.
Hsieh, "Extraction of Alumina from Anthracite Coal Waste Ashes in Shamokin (PA) Area", Final Report, Jan. 30, 1981, Aluminum Company of America, Alcoa Laboratories, Alcoa Center, PA 15069.
Beck "Electrolytic Production of Aluminum" , Oct. 2001 in "Electrochemistry Encyclopedia", 6 pages downloaded on Jan. 29, 2007 from http://electrochem.cwru.edu/ed/encycl/art-a01-a1-prod.htm.
Altenpohl "Chapter 2. Production and Processing of Aluminum" in "Aluminum: Technology, Applications, and Environment" 6th edition, pp. 7-25 and Table of Contents (3 pages), downloaded on Jan. 29, 2007 from http://www.tms.org/pubs/Books/4062.chapter2.pdf.
Ewall "Fact Sheet: Waste Coal", Jun. 1, 2006, 2 pages downloaded on Jan. 29, 2007 from http://www.energyjustice.net/coal/wastecoal/factsheet.pdf.
"Kirk-Othmer Encyclopedia of Chemical Technology" published by John Wiley & Sons, Inc., edited by J. I. Kroeschwitz and M. Howe-Grant, 1992, vol. 2, p. 284.
"Processing lower-grade bauxites" authored by the Commonwealth Scientific and Industrial Research Organisation, an Australian national agency downloaded from http://www.csiro.au/science/ps1n9.html (downloaded on Oct. 22, 2008 (2 pages).
http://www.amrclearinghouse.org/Sub/photogallery/, downloaded on Oct. 22, 2008 (2 pages).
Kunii et al., Fluidization Engineering, Second Edition, Butterworth-Heinemann Series, 1991, pp. 52-57.
http://en.wikipedia.org/wild/Catalytic, downloaded on Feb. 28, 2010, (9 pages).
http://www.newton.dep.anl.gov/askasci/chem03/chem03554.htm, downloaded on Feb. 28, 2010, (2 pages).
First Office Action of Chinese Patent Application No. 200780018739.3 issued Mar. 30, 2010, accompanied by English Translation.
Extended European Search Report issued in counterpart European application No. 07759152.7, dated Oct. 28, 2010.
Office Action dated Jun. 11, 2012 in counterpart European Application.
Office Action accompanied by English translation dated Apr. 6, 2012 in counterpart Chinese application.
Office Action dated Jun. 5, 2012 in counterpart Columbian application.
Office Action dated Apr. 25, 20212 in counterpart Indian application.
New World Encyclopedia, Catalyst From New World Encyclopedia downloaded on Jan. 9, 2011 from http://www.new-worldencyclopedia.org/entry/Catalyst, (6 pgs).
Spicer, "Pennsylvania Anthracite Refuse a Summary of a Literature Survey on Utilization and Disposal", Special Search Report SR-79, Mar. 15, 1971, The Pennsylvania State University, University Park, Pennsylvania, pp. 1-7.
Hosterman et al., World Nonbauxite Aluminum Resource Excluding Alunite, U.S. Geological Survey Professional Paper 1076-C, United States Government Printing Office, Washington, 1990.
Choate et al., "U.S. Aluminum Productions Energy Requirements: Historical Perspective, Theoretical Limits, and New Opportunities", pp. 1-12-1-24, Feb. 2003.
Kannan et al., "A Critical Appraisal and Review of Aluminum Chloride Electrolysis for the Production of Aluminum", Bulletin of Electrochemistry 1 (5), Sep.-Oct. 1985, pp. 483-488.
MacCartney et al., "A Survey of Solid Waste From Mining and Preparation", Pennsylvania Anthracite Refuse, 1969.

(56) References Cited

OTHER PUBLICATIONS

Sun et al., "Pennsylvania Anthracite Refuse a Literature Survey on Chemical Elements in Coal and Coal Refuse", Special Search Report SR-83, Apr. 30, 1971, The Pennsylvania State University, University Park, Pennsylvania, pp. 1-72.

Altenpohl, "Production and Processing of Aluminum", Aluminum: Technology, Applications and Environment, 6th Edition, Chapter 2, The Aluminum Association and the Minerals, Metals and Materials Society, pp. 7-25, 1998.

European Office Action in relation to European Appl. No. 07759152,7, dated Nov. 5, 2013.

* cited by examiner

METAL CHLORIDES AND METALS OBTAINED FROM METAL OXIDE CONTAINING MATERIALS

BACKGROUND OF THE INVENTION

1. Field of the Invention

The present invention relates to pyrometallurigal processing, including a process and apparatus for producing metal chlorides and metals from material having a metal oxide content, such as the adjacent rock strata of coal seams, or from industrial sources, such as solid byproducts of industrial plants.

2. Background Information

Historically, some metals for the metal working industry are produced from ores, which can contain high weight percentages, such as more than 50 wt. % of a metal oxide of interest (high-grade sources). Iron is generally produced from hematite ($Fe_2O_3$) or magnetite ($Fe_3O_4$), aluminum from bauxite ($Al_2O_3$) and titanium from rutile ($TiO_2$) or ilmenite ($FeTiO_3$). Their saturated content and the fact that most of these ores bear only one metal oxide making isolation and purification simple, made these ores the source of first choice for the metal working industry.

Nevertheless, metal oxides are present in all kinds of natural sources, e.g., geological minerals such as igneous, sedimentary or metamorphic rock material or from man-made sources such as industrial waste material. These sources however have a metal oxide content of less than 50 wt %, and are often present in a mix of various metal oxides. Low metal oxide content and high content of undesired silicates and other impurities caused their economical designation as waste. For example, the adjacent rock strata in coal mining describes material that lies above or below the coal seam; usually comprising of rock with some coal. During coal mining, some of the undesired adjacent rock strata is unearthed as well. This material is usually deposited as coal mine waste above ground covering vast areas of landscapes. Typically, coal mine waste comprises carbonaceous material (coal, tar, etc.) and rock material of metaliferous content, including aluminum oxides, iron oxides, titanium oxides, and other metal oxides depending on the geological nature of the adjacent rock strata. Generally, the total weight percentage of metal oxides in coal mine waste ranges between 15 and 30 wt. % of the coal mine waste. In the past, these amounts were too low to economically consider coal mine waste as a source for metal chlorides or elemental metals. The same holds true for metal oxide containing material from industrial sources such as the ash from coal fired power plants, which—due to their geological origin also have a weight percentage of metal oxides between 25% and 35%.

U.S. Pat. No. 6,808,695 B1 discloses a process for continuously producing aluminum from clays, such as kaolinite, illite or siliceous bauxite. U.S. Pat. No. 4,349,420 describes a process of fractional condensation/distillation for the production of aluminum chloride.

SUMMARY OF THE INVENTION

The present invention relates to a method and apparatus for production of metal chlorides and also the production of metals from these metal chlorides. The source for these products can be any metal oxide containing material that can also preferably contain a combustible heat source. Furthermore, the energy used in the method and apparatus can be conserved and recycled to be used at other parts throughout the process and apparatus.

The present invention relates to a method for preparing at least one metal chloride from metal oxide containing material including calcining the metal oxide containing material under temperature conditions sufficient to obtain a calcined product comprising at least one metal oxide and selectively chlorinating the calcined product to form at least one metal chloride.

The present invention further relates to a method for conserving energy in a metal generating process, comprising combusting a heat source to calcine metal oxide containing material, chlorinating at least one metal oxide and diverting energy from at least one of the combusting or the chlorinating to other parts of the process.

Furthermore, the invention relates to an apparatus comprising a chlorinator constructed and arranged for chlorinating a metal oxide containing material and an energy recycler constructed and arranged for recycling energy released in the chlorinator.

The method for preparing at least one metal chloride from metal oxide containing material can further comprise drying the metal oxide containing material.

The at least one metal oxide can contain at least one oxide of a metal comprising alkaline and earth alkaline metals, main group III with the exception of boron, main group IV with the exception of carbon and silicon, all transition metals, all lanthanides and actinides.

The calcining of the metal oxide containing material can be at a temperature between 1450 and 1750° F.

The metal oxide containing material can have a heat content and the heat for calcining can be provided by a heat content present in the metal oxide containing material.

The calcining can include addition of a heat source.

The selectively chlorinating can comprise carbochlorination.

The selectively chlorinating can include determining a content of metal oxides in the metal oxide containing material and using an amount of a source of chlorine and an amount of carbon from a carbon source in the selectively chlorinating based upon the determining. The amount of chlorine source can include an excess of 0.1 to 2 wt % based on the metal oxide content.

The at least one metal chloride can comprise at least two metal chlorides and separating the at least two metal chlorides. The separation can include fractional condensation/distillation of the at least two metal chlorides at pressures and temperatures to fractionally separate the at least two metal chlorides.

The at least one metal oxide containing material can comprise coal mine waste and/or solid industrial byproduct.

The method and apparatus can further comprise that the at least one metal chloride from metal oxide containing material can further include separating solids from gases and separating the gaseous metal chlorides by fractional condensation/distillation. The separating solids from gases can include separating liquids from solids. Also, the separating includes separating liquids from gases. Furthermore, the fractional condensation/distillation can include condensation and distillation of metal chlorides at pressures between atmospheric and 60 psig.

The method can comprise forming metals from the metal chlorides.

The method can further include using excess heat from at least one of the calcining and the selectively chlorinating in the process.

The method and apparatus can further comprise generating electricity.

Energy from the process and apparatus can be used.

The method and apparatus can further comprise a heat exchanger constructed and arranged to capture the energy released from the chlorinator and diverting heat to an electricity generation unit.

The method and apparatus can further comprise a metal producing section constructed and arranged to form at least one metal from at least one metal chloride from the chlorinator.

The method and apparatus can further supply electricity from the electricity generation unit to the metal producing section.

BRIEF DESCRIPTION OF THE DRAWINGS

The present invention is further described in the detailed description which follows, in reference to the noted plurality of non-limiting examples of exemplary embodiments of the present invention, in which like reference numerals represent similar parts throughout the several views of the drawings, and wherein.

DETAILED DESCRIPTION OF THE EMBODIMENTS

Figure 1:
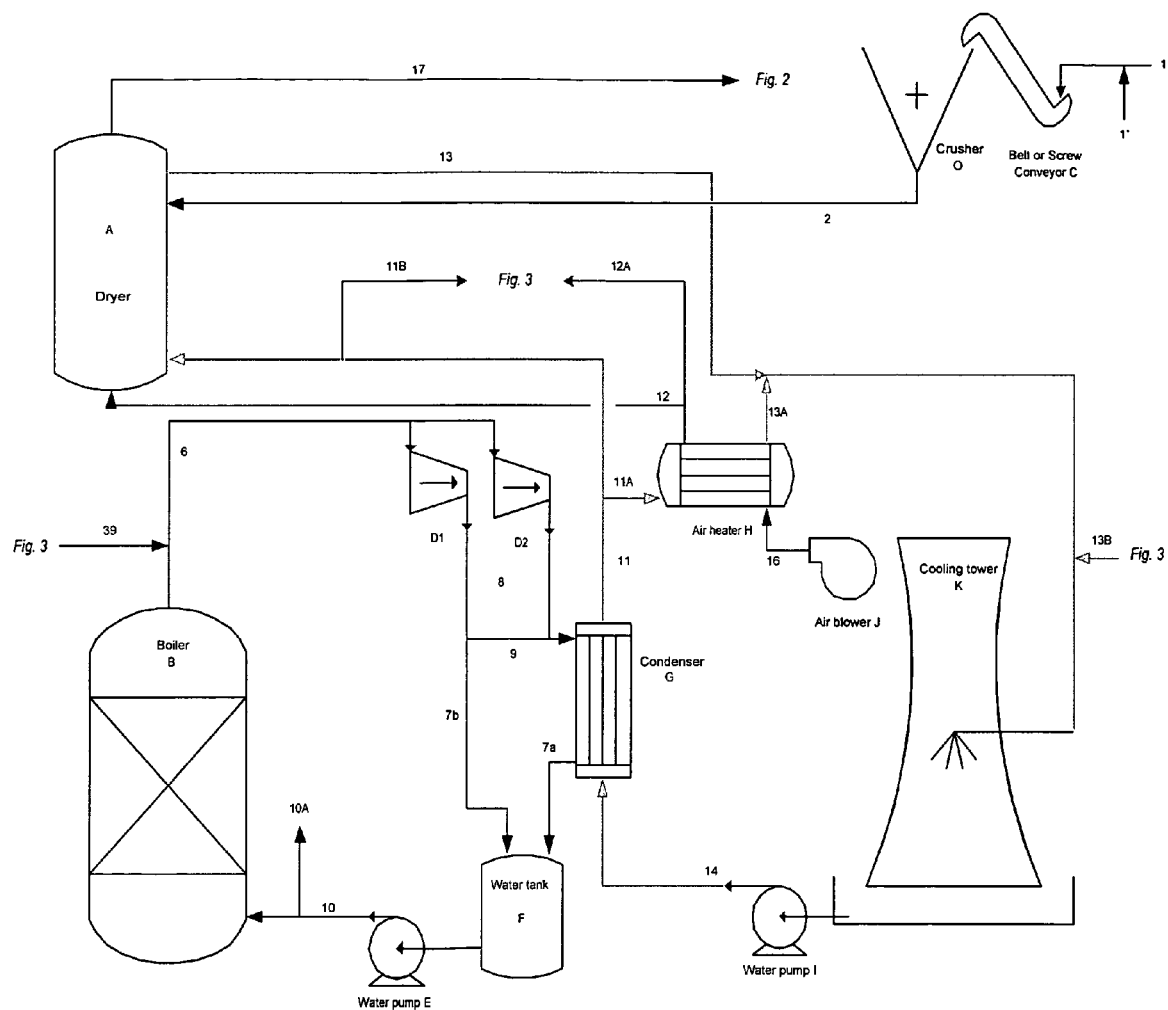
FIG. 1 is a part of a plant diagram illustrating the coal and coal mine waste drying section.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Unless otherwise stated, a reference to a compound or component includes the compound or component by itself, as well as in combination with other compounds or components, such as mixtures of compounds.

As used herein, the singular forms "a", "an" and "the" include the plural reference unless the context clearly dictates otherwise Except where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Additionally, the recitation of numerical ranges within this specification is considered to be a disclosure of all numerical values within that range. For example, if a range is from 1 to about 50, it is deemed to include, for example, 1, 7, 34, 46.1, 23.7, or any other value within the range.

The term metal oxide describes a compound that can be chemically generated from a metal and oxygen containing compound such as oxygen. The following groups of the periodic table are considered metals: alkaline and earth alkaline groups, main group III with the exception of boron, main group IV with the exception of carbon and silicon, all transition metals, all lanthanides and actinides. All other elements, including boron, carbon and silicon, are considered non-metals. The term oxides also includes any intermediate form of the compounds such as, but not limited to, peroxides, superoxides and suboxides.

Furthermore, it is understood that compounds that can decompose into a metal oxide and another material are considered metal oxide containing materials as well. For example and without limiting the scope of the invention, a metal carbonate can be considered a metal oxide containing material since it decomposes to a metal oxide and carbon dioxide upon treatment such as heating. Similarly, compounds that are generated from metal oxides and non-metal oxides are also considered to be metal oxide containing materials. For example, aluminum silicates are metal oxide containing because they can be generated from aluminum oxide (metal oxide) and silica (non-metal oxide). The method and apparatus relate to the production of metal chlorides from metal oxide containing material. The metal oxide containing material can include any material having a metal oxide content as well as mixtures of such materials. Thereby, the process and apparatus of the present invention can utilize any metal oxide containing material.

The metal oxide containing material can also comprise metal oxide containing materials that are ordinarily not regarded as an economical and/or useful source for obtaining metal chlorides or metals. Thus, metal oxide containing materials can be used in the process and apparatus of the present invention that have a low content of at least one metal oxides, such as a low content of metal oxides as not to be considered economical and/or useful for the production of metal chlorides and/or metals. Without limiting the scope of the invention, materials utilized in the method and apparatus according to the invention include waste, such as for example coal mine waste, tar, oil refinery waste, coal fired power plant solid byproducts, asphalt concrete waste, preferably coal mine waste and/or power plant solid-byproduct.

For example, materials utilized according to the invention can have a low metal oxide content, such as a metal oxide content of less than about 50 wt. %, and includes ranges of 5 to 40 wt. %, 10 to 35 wt. % and 15 and 30 wt. %.

Preferably, the metal oxide containing material contains a combustible component that can provide as much energy as possible, preferably between 50 to 100%, more preferably between 60 to 100%, most preferably between 80 to 100% based on the energy requirement needed for the process including at least the formation of one or more metal chlorides, and most preferably the formation of elemental metal. Ideally, the heat content intrinsic to the metal oxide containing material is sufficient to provide the entire energy requirement for the process from formation of the one or more metal chlorides as well as production of metals therefrom.

The method and apparatus includes chlorination of the metal oxide containing material to form metal chlorides which can be converted into elemental metal. Preferably, the chlorination comprises selective chlorination. Selective chlorination describes the generation of metal chlorides from metal oxide containing material. Conditions of the method and amounts of a chlorinating agent are chosen to form metal chlorides without substantial formation of non-metal chlorides. For example, and without limitation to the method and the apparatus, if coal fired power plant ash is used as a metal oxide containing material having as an ingredient silicon containing material, such as silica and silicates, and further aluminum oxide and sodium oxide, selective chlorination according to the present invention would provide aluminum chloride and sodium chloride without substantial inclusion of silicon chloride. Furthermore, it should be understood that the method and apparatus for selective chlorination according to the invention does not use nor require any catalyst, such as sulfur-containing compounds, in addition to the chlorinating agents. The amount of non-metal chlorides produced is ideally zero, or substantially less than about 10 wt. %, more preferably less than about 5 wt %, most preferably less than about 1 wt % based on the total weight of the starting material.

Chlorinating agents include a source of chlorine and a reducing agent. The source of chlorine can comprise chlorine gas and/or any compound that provides elemental chlorine. The reducing agent can comprise any compound capable of reducing the oxygen contained in the metal oxides, such as carbonaceous compounds, including carbon, coal, organic compounds, and natural gas; carbon monoxide; also other metals such as iron can be considered as reducing agents. The source of chlorine and the reducing agent can be present in a mixture and/or can comprise the same compound, such as, for example, chlorinated organic materials, such as phosgene or chlorinated aliphatic compounds, for example, chloroform or carbon tetrachloride or chlorinated aromatic compounds such as chlorobenzenes. Preferably, the chlorinating agent does not contain moisture. The source of elemental chlorine and/or the reducing agents can be dried in any manner for example the reducing agent can be dried in a similar manner to the drying process described for the metal oxide containing material. Also, the chlorinating agent can comprise hydrogen chloride.

Furthermore, the present invention provides method and apparatus for preparing metal chloride from metal oxide containing material wherein the chlorination comprises carbochlorination, preferably using selective chlorination thereby providing selective carbochlorination. In this regard, carbochlorination describes a method for the generation of metal chlorides from metal oxides using a chlorinating agent as described above, preferably chlorine gas and a carbonaceous reducing agent, preferably a carbon source such as coal. Moreover, the source of chlorine can include chlorinated organic materials. Any combination of these materials can be used. The combination of chlorine and carbonaceous reducing agent in this process results in the formation of metal chlorides from the metal oxides. Thereby, the oxide anions of the metal oxides can form carbon monoxide and/or preferably carbon dioxide.

The present invention also provides method and apparatus for separation of gaseous metal chlorides by fractional condensation/distillation. Mixtures of hot gaseous metal chlorides are gradually cooled, preferably above atmospheric pressure. According to the pressure/temperature phase diagram of many metal chlorides, elevated pressure results in condensation (gas-liquid transfer) of the metal chlorides instead of desublimation (gas-solid transfer) which occurs at normal atmospheric pressure. Condensation of the metal chlorides is preferred because it allows for a more efficient separation of a mixture of metal chlorides than desublimation. Accordingly, the present invention preferably achieves a high purity separation of metal chlorides by utilizing fractional condensation/distillation from gas to liquids.

The method and apparatus can also provide for energetically efficient use of heat sources making the process economically viable. The heat/energy released in the process can be diverted to energize any other part of the process. For example, the heat generated in a calciner or chlorinator, can serve to dry a charge of feed metal oxide containing material from moisture and humidity. Also, heat from the calciner or chlorinator can be used externally to the process, or can also be used, for example, for generating electricity which then can be externally used and/or used internally for the reduction of separated metal chlorides to elemental metals in the metal generation section.

Furthermore, within the scope of energetically efficient use of heat, the method and apparatus can comprise the use of heat content of the metal oxide containing material. Preferably, no outside source of heat content is necessary for the process. For example and without limitation to the scope of the invention, when coal mine waste is used as a metal oxide containing material, preferably no additional energy, such as the addition of coal, is added to the process, and the coal content of the coal mine waste is utilized to provide all or substantially all of the energy requirement of the process. However, an addition of coal up to 10 wt %, up to 20 wt %, up to 30 wt % of the total weight of the coal mine waste can be added depending upon the energy requirement of the process. Natural gas can be used as a flame-out prevention source for the calciner.

The process and apparatus according to the present invention can be part of a system all located at one place, or can comprise various process steps and apparatus that can be located near each other or can be remotely located with respect to each other. Preferably, the process and apparatus for the processing of the metal oxides into metal are performed and located at one place for economic and/or processing efficiency. Thus, while portions of the process can be practiced at diverse locations, and apparatus can be placed at various locations, it is preferred that the apparatus for processing the metal oxide containing material to metal comprises a system located at one location.

The present invention can provide a plant comprising a drying section for drying material, such as metal oxide containing material and/or carbonaceous material, from moisture and humidity. The drying section can possess transportation devices, such as conveyors or belts to transport dried material to a calcination section, where dried feed material can be calcined.

The calcination section can further comprise transportation components to transport hot ash to a chlorination section. The chlorination section can include a reaction chamber structured and arranged for chlorination, preferably selective chlorination, and most preferably selective carbochlorination. For example, the reaction chamber can include suitable inlets to combine dry carbonaceous material, such as dried coal, natural gas or oil, with a chlorine source, such as chlorine and the hot solid product from the calcination section. Furthermore, the reaction chamber can include inlets for gases, such as nitrogen. The chlorination section serves to form metal chlorides from hot solid product which are then transported or diverted to a separation section. The pressure in the chlorination section can be greater than the pressure in the first stage fractional condensation/distillation unit of the separation section.

The drying section, the calcination section and the chlorination section can comprise any apparatus sufficient to obtain drying, calcinations and chlorination. Such apparatus can be of a fixed bed or fluidized bed structure and can include various fluidizing media such as inert gases, such as nitrogen, or air and flue gases.

The separation section can comprise a separator to separate solids from liquids and solids from gases, e.g., a cyclone, as well as a separator that separates liquids from gases. Furthermore, the separation section can comprise at least one fractional condensation/distillation unit for each desired metal chloride product, where gaseous metal chlorides of different physical properties can efficiently be separated. The separation section can further include transportation devices to transport separated metal chlorides for further processing and handling, for example the method and apparatus may include metal production systems comprising reaction chambers where metals can be generated from obtained metal chlorides, such as by electrolytic processes or by use of reducing agents such as alkali and earth alkali metals. The separation section can include any apparatus for achieving the separation, and preferably comprise at least one fractional condensation/distillation unit for separation of gaseous metal chlorides and are preferably a plurality of condensation/distillation units.

Further expanding on the above, the metal oxide containing material can be dried to a sufficient extent that it becomes suitable for combustion. Drying of the material can serve to remove free water, such as moisture and humidity in the material. Dry material is preferred to avoid any energetically undesired steam generation in the process. Preferably, no free water is contained in the material prior to charging the calciner. However, a free water content which ranges between 0 and 10 wt % based on the total weight of the metal oxide containing material is acceptable without causing detriment to the process such as excessive waste of heat due to unnecessary steam generation. The drying is preferably continued until the waste is freed from moisture, humidity or unbound water.

The dried material is transported to a calciner where it is calcined at a temperature between 1450 and 1750° F., preferably between 1500 and 1600° F. most preferably between 1550 and 1570° F. Calcination is the act or process of heating a material to a high temperature without causing the material to fuse and to drive off volatile ingredients or to effect changes such as pulverization. The non-combustible material can include various aluminum silicates with diverse chemical formulas such as $MgAl_2(SiO_4)_3$. Calcination of this non-combustible material causes a change in the structure by breaking bonds in the alumosilicate framework and causing decomposition of the alumosilicate into aluminum oxide, magnesium oxide and silica. The calcined material serves as an intermediate material for the process.

The calcination can be performed in an oxidizing atmosphere such as air and/or recycled flue gases. Combustible material present in the metal oxide containing material can be combusted in the oxidizing atmosphere to thereby provide heat that can be used in the process. For example, when coal mine waste is used, combustion during calcination can be fueled by heat content present in the metal oxide containing material. Thus, for example, carbon material such as residual coal present in coal mine waste can serve as a heating source. If desired, supplementary sources of combustible material, e.g., coal, natural gas or oil, etc. may be added.

Following the combustion, the hot solid product can be transported to a chlorination chamber where metal chlorides are formed using chlorination, preferably selective chlorination and more preferably selective carbochlorination. The hot solid product can be mixed with a chlorinating agent, preferably a dry chlorinating agent.

Furthermore, a source of chlorine, such as chlorine gas, can be supplied from a recycling process from the metal plant. For example, the chlorine gas can be supplied from a recycling process from the metal plant and/or from a chlorine storage unit. A reducing agent can be supplied from a dryer. Both the amount of reducing agent and the amount of chlorine added can be controlled to yield chlorination of metal oxides where selective chlorination is desired. The measured amount can be determined by analytical methods to give a content of metal oxides present in the metal oxide containing material such as, for example, weight percentages of metal oxide present in coal mine waste or in ash. The measured amounts of reducing agent and chlorine can then be calculated to satisfy chemical reactions such as shown here for aluminum, iron and titanium:

$$Al_2O_3 + 3Cl_2 + 3C \rightarrow 2AlCl_3 + 3CO$$

$$Al_2O_3 + 3Cl_2 + 1.5C \rightarrow 2AlCl_3 + 1.5CO_2$$

$$Fe_2O_3 + 3Cl_2 + 3C \rightarrow 2FeCl_3 + 3CO$$

$$Fe_2O_3 + 3Cl_2 + 1.5C \rightarrow 2FeCl_3 + 1.5CO_2$$

$$TiO_2 + 2Cl_2 + 2C \rightarrow TiCl_4 + 2CO$$

$$TiO_2 + 2Cl_2 + C \rightarrow TiCl_4 + CO_2$$

Limiting the amounts of chlorine and reducing agent as well as omitting a catalyst such as a sulfur containing compound, for example, hydrogen sulfide, avoid the chlorination of silicon oxide. Therefore, the formation of undesired side products can be minimized. After the selective chlorination, unchlorinated residues, mostly comprising silicon oxides, can be separated from the formed metal chlorides, which are either present as liquid melts, e.g., NaCl or $MgCl_2$, or as gases, e.g., $AlCl_3$, $FeCl_3$. Carbon monoxide formed in the process can be recycled to be further combusted to carbon dioxide. For example, stoichiometric amounts of chlorine based on the metal oxide content can be used. Also, a chlorine excess of up to about 10 wt %, preferably up to about 5 wt %, more preferably up to about 2 wt %, most preferably between 0.1 and 2 wt % based on the metal oxide content can be directed into the chlorinator to achieve maximum yield of the metal chloride. Furthermore, a reducing agent excess of up to about 10 wt %, preferably between about 5 and about 10 wt %, most preferably between about 7 wt % to about 10 wt % can be used, based upon the content of metal oxide.

After the chlorination, solids are separated from gases, and liquids if present, and the gases and liquids if present are subject to the separation techniques. Preferably, mixtures of gases of metal chloride are separated using fractional condensation/distillation.

For example, the gaseous metal chlorides can be directed into a separation section where gases are fractionally condensed and distilled by gradually cooling at elevated pressure. The pressure in the separation section is elevated and ranges from atmospheric pressure (~14.7 psia) up to 80 psig, preferably between 20 psig and 70 psig, most preferably between 40 and 60 psig. At elevated pressures the gases are fractionally cooled resulting in the condensation and the distillation of one species of metal chloride over another species of metal chloride. Condensation and distillation temperatures are depending on the elevated pressure and can lie anywhere between 100° F. and 1000° F. However and without limiting the scope of the method and the process, if the elevated pressure is chosen at 50 psig, condensation and distillation temperatures of metal chlorides comprising the metal group aluminum, titanium and iron can be between 275 and 675° F. Condensation and distillation temperatures can be derived from phase diagrams for each species which are known in the art. Furthermore, besides the fractional cooling of the metal chloride gases, the method allows to vary the elevated pressure during the cooling process if desired to gain maximum separation between species of metal chlorides.

It is understood that because of the corrosive nature of the chlorinating agent and the metal chlorides either as liquids or gases, the method and apparatus can include inert and corrosion resistant materials to avoid any reaction between the generated metal chlorides or the unreacted chlorinating agent and the apparatus. These protective measurements include utilization of corrosion resistant materials. For example and without limiting the scope of the invention, the walls of the chlorinator can be lined with refractory lining comprising high silica acid brick or silicon carbide bonded bricks; and outlets and pipes transporting metal chlorides and other corrosive reaction products can comprise ceramic lined pipes or corrosion resistant high-nickel alloy pipes. For temperatures of 400° F. or less, tetrafluorinated polyethylene lining can be considered.

Reference will be made to the drawings with respect to the following non-limiting embodiments of the invention wherein coal mine waste or power plant solid byproduct is used as the metal oxide containing material and exemplary process and apparatus for metal chloride and metal production are discussed. For example, coal mine waste can have a content of 5-35 wt. % carbon, 0.25-0.75 wt. % hydrogen, 10-12 wt. % water, 35-45 wt. % silicon dioxide, 15-25 wt. % aluminum oxide, 1-3 wt. % iron oxides, 0.5-1.5 wt. % titanium oxide and trace amounts of other metal oxides. Although, the method finds application using coal mine waste of above-mentioned composition, coal mine wastes of other compositions are contemplated as well. Therefore and without limiting the scope of considered metal oxides in other embodiments, the coal mine waste can contain, for example, oxides of the following metals in varying concentrations; gallium, indium, germanium, tin, lead, antimony, bismuth, vanadium, chromium, beryllium, manganese, cobalt, nickel, copper, zinc, zirconium, ruthenium, osmium, rhodium, iridium or uranium. Similarly, power plant ash can contain various amounts of metal oxides.

Figure 3:
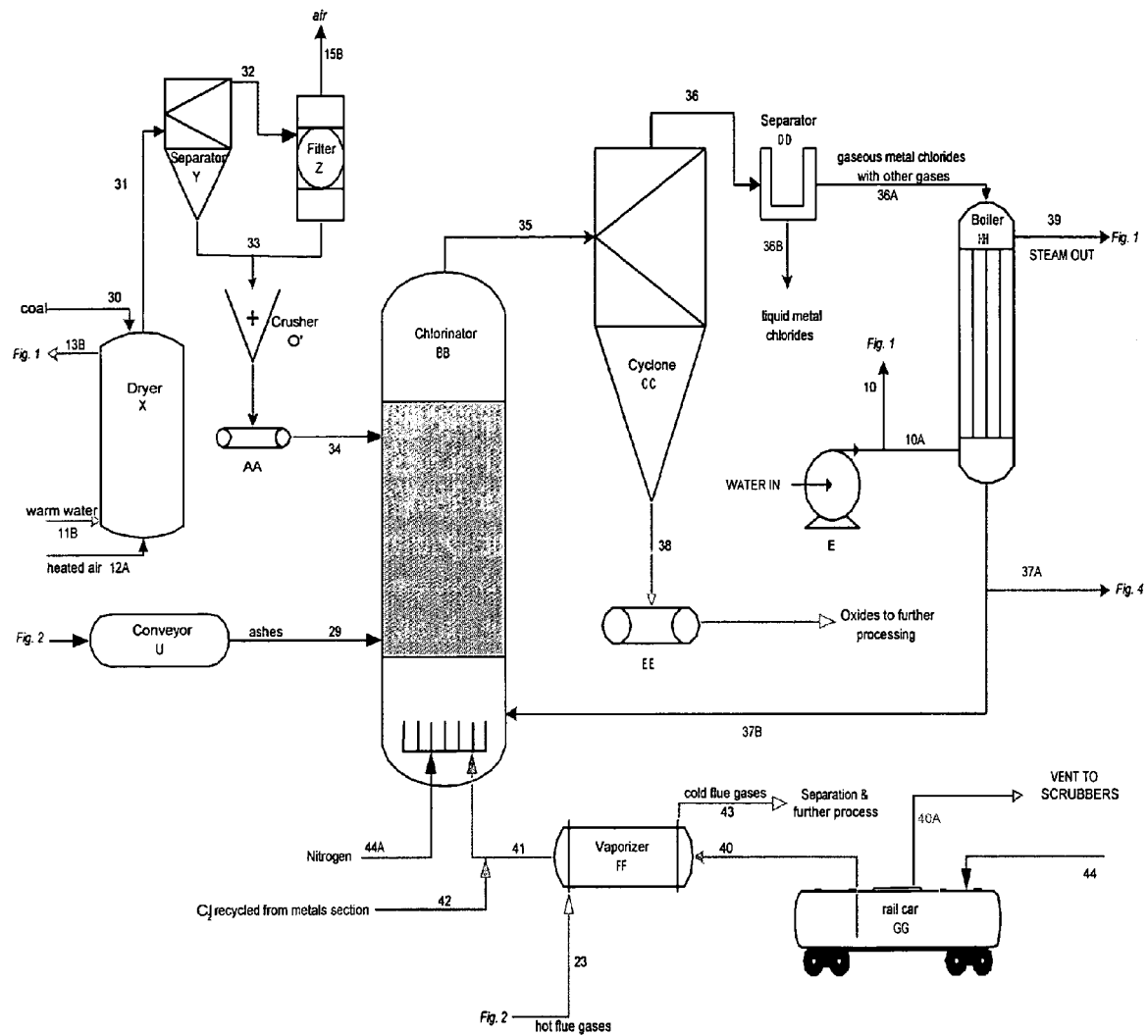
FIG. 3 is a part of a plant diagram illustrating the chlorination system.

In FIG. 1, waste (1) and/or virgin coal (1') is conveyed into the dryer (A) using a belt or screw driven conveyor into crusher O and ground into fine particles with a size between about 1 and about 20 mm, more preferably between about 3 to about 6 mm, most preferably about 4 mm. The crushed material is transported into dryer A via line 2. A cooling water pipe (14) feeds cooling water from a cooling tower (K) and cooling water pumps (I) through a steam condenser (G). G condenses steam (9) from the turbines (D1 and D2), thus heating the cooling water from about ambient to about 212° F., preferably between about 80 to about 180° F., most preferably between about 100 to about 140° F. The condensate (7a), now the boiler feed water, is directed to the boiler water feed tank (F) which serves as a holding tank. The water is then pumped to the boiler/calciner (B) with the boiler water feed pumps (E) and the cycle is repeated. The warm cooling water stream (11A) from the steam condenser is then used to heat ambient air from blower J in heater H from ambient to about 212° F., preferably between about 80 to about 180° F., most preferably between about 95 to about 105° F. The warm cooling water (11) is also used to heat coal in the fluidized bed dryer (A). The water discharge of H returns to the cooling tower K via lines 13A and 13. The heated air (12) is used to dry the material dryer A and the circulating water (11) flows through heat exchanger pipes within the dryer to provide most of the energy required for drying the material. The dried material exits the dryer via line 17, along with air. Some of the warm air (12A) and water (11B) created in this drying process is used to dry the coal for the chlorination reaction as shown in FIG. 3. The water (11B) used in the coal dryer returns to the cooling tower via line 13B.

Figure 2:
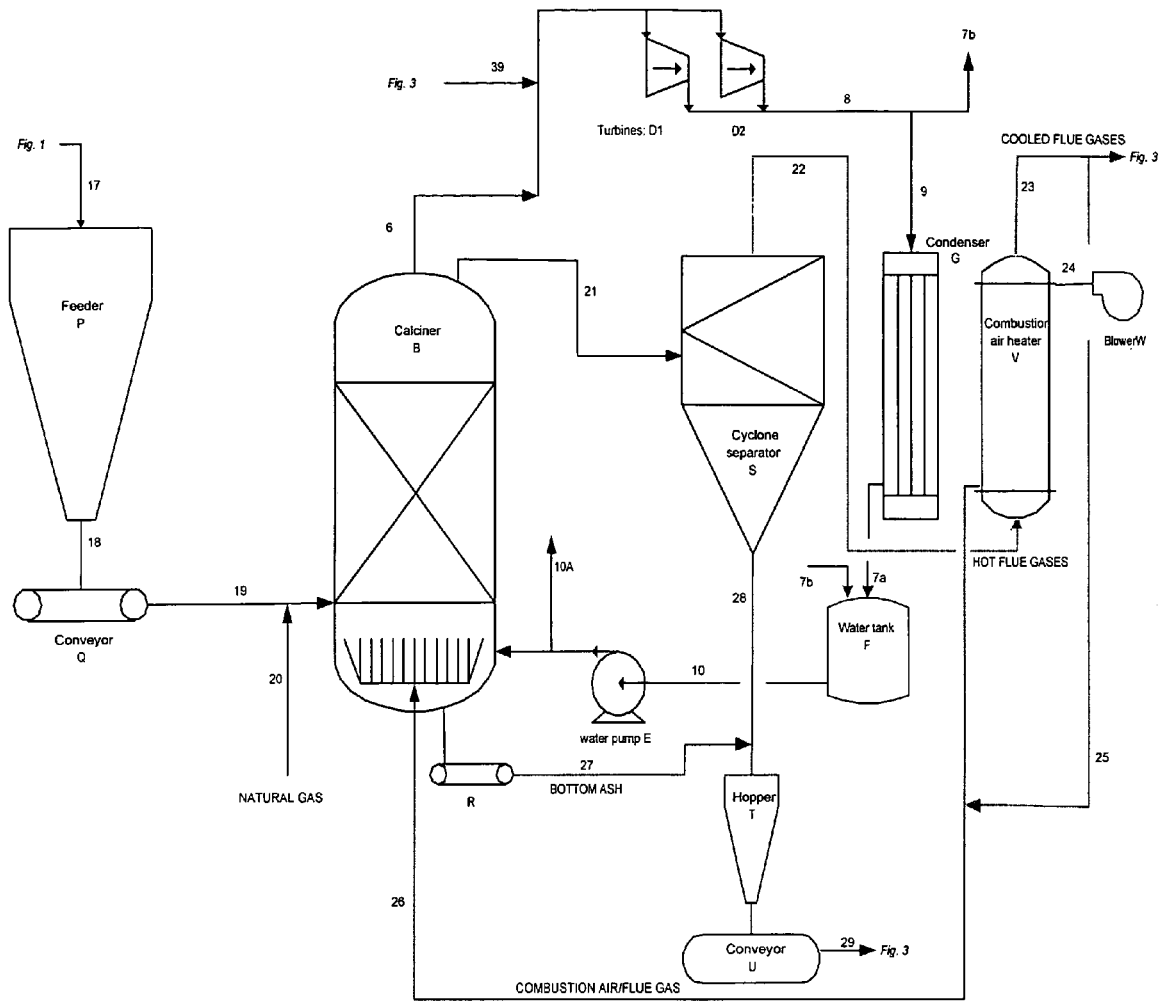
FIG. 2 is a part of a plant diagram illustrating the fluidized bed boiler also described as calciner.

In FIG. 2, dried material charges via line 17 into a large feeder (P) and the mixture of waste and the heat source is released through line 18 and fed into the fluidized bed calciner (B) with conveyor (Q, line 19). The heat source is added to increase the heating content of the boiler for additional steam and electricity production. For example, in order to keep the method and the plant electrically self sufficient, coal additions ranging up to about 30 wt % relative to the coal mine waste feed may be used. Natural gas provided via line 20 is used as a flame-out prevention source and/or a fuel supplement. The boiler content is burned within a controlled temperature range between about 1450 to about 1750° F., preferably between about 1475 to about 1650° F., most preferably between 1550 and 1570° F. Combustion air, along with some flue gas recycle from line (25), is added to the bottom of the boiler via line 26 through distribution sparge pipes designed to uniformly lift and fluidize the solids. The air flow and velocity is controlled in order to maintain the predetermined bed height and the mentioned temperature range. The internal bonds within the ash are broken and each individual oxide is free of any chemical water bond. For example, coal mine waste ash has a typical composition of about 55-65% silicon oxide, about 25-35% aluminum oxide, about 2-4% iron oxides, about 1-2% titanium oxide and residual amounts of various trace materials. Along with the carbon, the entrained hydrogen is burned which contributes to the heating content. The entrained water is boiled off and exits with the flue gas via line 6. Most of the solids (ash) exit with the flue gas which is sent via line 21 into a gas/solid separation system comprising at least one cyclone separator (S). The remaining ash falls via line 27 to the bottom of the boiler and is rejoined with the separated solids from line 28 after the cyclone separator via conveyor R. Streams 27 and 28 fall to a holding device such as a hopper (T) before being transported, by a transporter, e.g., screw driven conveyor system U, to the chlorination system. There the metal oxides are mixed with a carbon source, such as coal (reducing agent) and a chlorine source, such as chlorine gas to produce chlorides of metal oxides. The oxide content of the ash is not limited to the listed compounds. The ash may contain any of the intermediate oxides, such as peroxides, and superoxides. The chlorination process is described below.

Still referring to FIG. 2, the combustion air blown from blower W via line 24 is to be preheated by (post cyclone) flue gas (22) to between about 275 and about 325° F., optimally about 300° F. in heater V. After preheating the air, the cooled flue gas (23), now at approximately 1300° F. is used further downstream (see FIG. 3) for example to vaporize and heat the chlorine source such as chlorine gas from a recycling unit or an intermediate storage unit such as a railcars. The hot air also assists in heating the molten salt electrolyte in aluminum production cells and titanium production cells. The steam produced in the boiler's super heater reaches upwards of about 500 psi and about 800° F. before being sent to the steam turbines (D1 and D2) via line 6. Steam (39) from the chlorinator is joined with stream 6 before entering D1 and D2. Low pressure steam from the turbines may be used for heating or cooling other process streams, most likely the salt electrolyte in the aluminum cells before being sent back to the boiler as feed water (7*b*). The remainder of the post turbine steam is sent directly to condenser G to be condensed and pumped as feed water stream 10 back to the boiler/calciner.

In FIG. 3, a reducing agent such as a carbonaceous material like coal (carbon reducing agent) is dried before the carbochlorination process to avoid the formation of corrosive hydrogen chloride during the process. As mentioned above, this may be accomplished in a small scale replication of the waste dryer system in FIG. 1. Coal is conveyed to the top of dryer X via line 30. Heated air (12A) fluidizes the coal and warm water (11B) is used as the primary heat transfer fluid as it passes through internal heat exchanger pipes. The water discharges from the dryer via line 13B and is returned to the cooling tower (K, FIG. 1). The fluidizing air exits the top of the dryer X via 31, along with the warm, dry coal and goes through a cyclone separator (Y) and/or a bag filter (Z) to separate the coal (33) from the air (32). The separated coal is crushed to particle sizes between about 1 to 20 mm, preferably between about 3 to 6 mm, most preferably about 4 mm and fed to the chlorinator by conveyor AA through line 34. The post filter air (15B) is vented to the atmosphere.

Still referring to FIG. 3, the ash from the cyclone S and is conveyed into the chlorinator (BB) by a transporting device U such as a screw driven conveyor system (line 29) and mixed with dried carbon source and chlorine source, such as chlorine gas in the fluidized bed reactor of chlorinator BB. The hot ash metal oxides are chlorinated by the chlorine source, producing metal chlorides and oxygen. The oxygen is reduced by the carbon source, i.e. the hot oxygen combusts the carbon producing a mixture of CO and $CO_2$. The chlorine comes from two supply sources: most is recycled (42) from the metals plant directly into the reactor and any necessary supplement is brought in (40) liquefied via railcar. The liquid chlorine is air or nitrogen padded (44) out of the railcar (GG) directly to a vaporizer (FF) where it is vaporized by hot flue gas (23) from the boiler. The railcar is vented 40A to a scrubber as a safety mechanism. The flue gas (43) is then sent through a series of separators in an attempt to separate various gases for further processing. The chlorine gas (41) is then fed into the reactor. As described above, amounts of chlorine necessary are determined by an analysis for the weight percentage of metal oxides in the metal oxide containing starting material or in the hot ash from the boiler B. Preferably, a chlorine excess of up to about 5 wt %, more preferably up to about 2 wt %, most preferably between about 0.1 and about 2 wt % is directed into the chlorinator to achieve maximum yield of metal chlorides. Similarly, the dried reducing agent (coal) fed through line 34 into the reactor also has an excess between up to about 10 wt %, preferably about 5 wt % to about 10 wt %, most preferably 7 wt % to about 10 wt % to achieve maximum yield of metal chlorides without generation of undesired side products. In order to obtain an ideal fluidized bed within the chlorinator, a dry inert gas such as nitrogen (44B) is added to the bottom of BB. The pressure inside the chlorinator can be maintained at various levels, preferably the pressure is higher than at the first stage of the separation unit.

The non-chlorinated solids comprising of mainly silicon dioxide, exit the reactor along with the metal chlorides, excess chlorine, and other gases at approximately 2000° F. via line 35. This exit temperature is dependent on the composition of stream 29 which is constantly variable. The reactor discharges directly into a separation system comprising at least cyclone separator CC where the solids exiting through line 38 are separated from the liquid/gas mixture exiting through line 36. The separator DD separates the liquid alkali/alkali earth metal chlorides via line 36B from the gas directed through line 36A. Stream 36A may be sent through an additional separation device (cyclone, centrifuge, or filter) in order to separate the remaining liquids and solids from the gases. All the solids separated from the gases are sent to the solids processing plant using conveyor EE via line 38. The liquid-free gas from DD via line 36A is then cooled using its energy to boil a stream of water supplied from line 10A (FIG. 1) in boiler HH, thereby creating superheated steam, which is sent through line 39 to the turbines D1 and D2 (FIG. 1) for electricity generation. Boiler HH receives feed water from boiler feed water pump E (FIG. 1). Most of the cooled gases (37A) at approximately a temperature between about 500 to 1000° F., more preferably between about 615 and about 630, most preferably about 620° F. are then sent to the primary separation system but some can be recycled (37B) back to the chlorinator.

Figure 4:
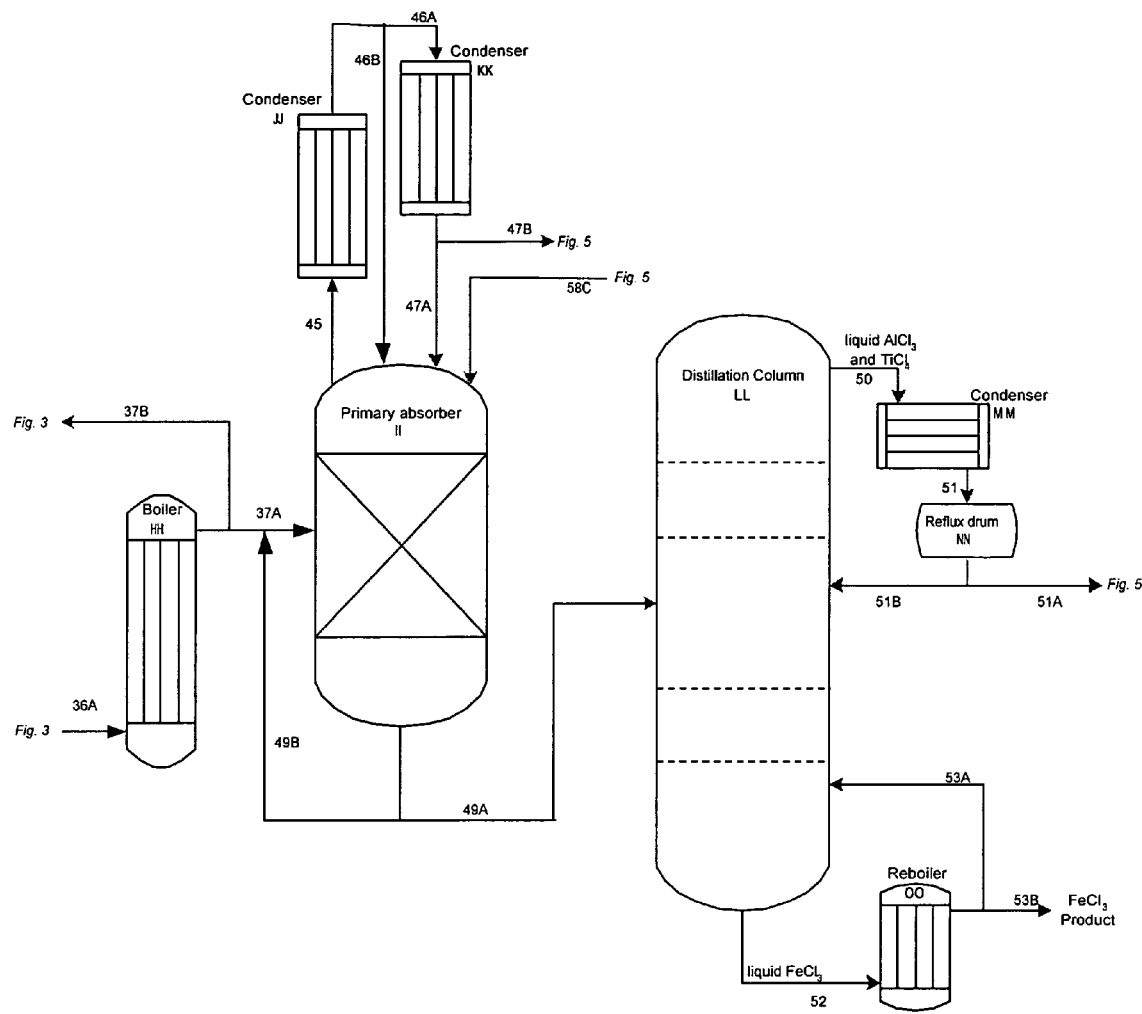
FIG. 4 is a part of a plant diagram illustrating the primary separation system.

In FIG. 4, the gas stream (37A) from HH enters the middle of the primary absorber (II) and is cooled by recycle liquids to be described. As the upward flowing gases come in contact with the downward flowing liquids, the gases cool to between about 330 and about 370° F., optimally about 350° F. (at the bottom of the absorber), condensing the $FeCl_3$. The bottoms (heavy key) stream (49A) of the primary absorber contains condensed $FeCl_3$, gaseous $AlCl_3$, $TiCl_4$, and other trace metal chlorides. Some of the heavy key stream is recycled (49B) back to the inlet of the primary absorber in order to obtain optimal absorption. The top stream (45) of the primary separation vessel contains gaseous $AlCl_3$, $TiCl_4$, and other trace metal chlorides. This stream is sent through condensers (JJ and KK) to cool and condense the $AlCl_3$ and $TiCl_4$. The condensate (46B) of the primary condenser (JJ) which contains liquid $AlCl_3$ and gaseous $TiCl_4$ and other trace metal chlorides at about 210 to about 220° F., optimally about 215° F. will return to the primary absorber to be used as the majority portion of the liquid feed. The non-condensed gases (46A) will go through a sub-condenser (KK) to remove $TiCl_4$ as a cold liquid at temperatures below 0° F. A chilled refrigeration system is required to accomplish this sub-condensation. The condensate (47A) returns to the primary separation vessel to be used as a portion of the liquid feed and the non-condensed gases (47B) are sent for further processing in the $TiCl_4$ condensation system (FIG. 5).

Still referring to FIG. 4, the condensed metal chlorides (49A) from the bottom of the primary absorber are sent to the primary distillation column (LL) where $FeCl_3$ is distilled from the lighter $AlCl_3$ and $TiCl_4$. $FeCl_3$ is removed via the bottoms stream (52) of the column and $AlCl_3$ and $TiCl_4$ are removed as the distillate (50). The temperature at the reboiler (OO) is maintained at about 640 to about 675° F., optimally about 660° F. Depending on the required vapor rate, boiled chlorides (53A) are returned to the primary distillation column and the remainder is $FeCl_3$ product (53B). The distillate stream in line 50 is passed through condenser MM which maintains a temperature between about 330 and about 370° F., optimally about 350° F. The condensate (51) then goes to the reflux drum (NN) holding vessel where it is split according to the reflux rate by recycling some to the primary distillation column (51B) and feeding the remainder (51A) to the secondary separation system (FIG. 5). The primary separation system is maintained at a pressure greater than that at which either $FeCl_3$ and/or $AlCl_3$ would desublimate or freeze at any of the temperatures between about 140 and about 675° F. Preferably, this pressure is above atmospheric pressure and about 80 psig, more preferably between about 20 to about 60 psig, most preferably between about 35 to about 45 psig.

Figure 5:
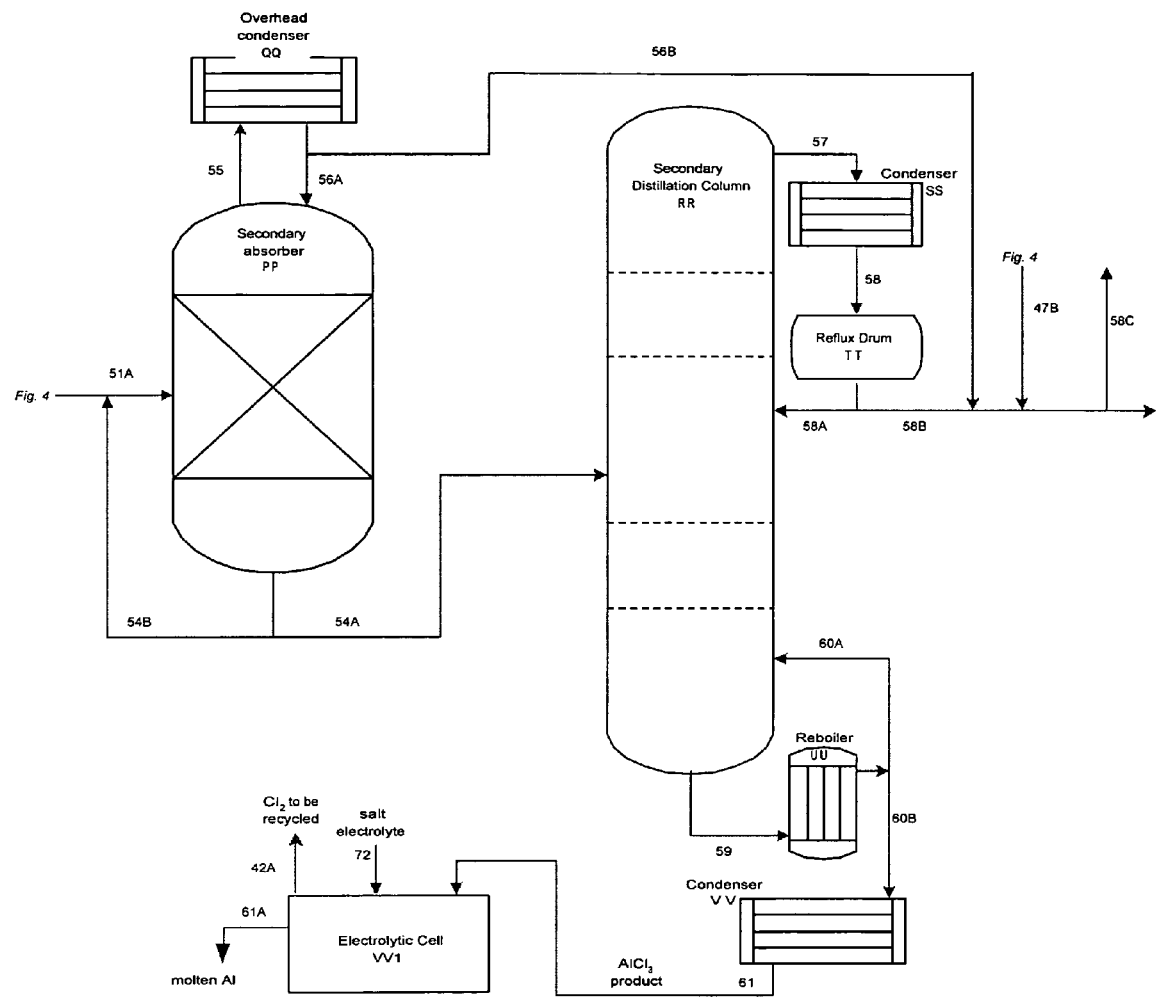
FIG. 5 is a part of a plant diagram illustrating the secondary separation system and the aluminum production system.

In FIG. 5, the distillate (51A) from the primary distillation column flows to the secondary absorber (PP) and is cooled by overhead liquids to be described. As the upward flowing gases come in contact with the downward flowing liquids, the gases cool between 280 and 330° F., optimally 300° F. (at the bottom of absorber PP). The overhead condenser (QQ) maintains the top of PP at a temperature between 210 and 220° F., optimally 215° F. Stream 55 is cooled and a portion of the $TiCl_4$ in the gas mixture is condensed and returned to PP. The condensate is split between stream 56A, which falls back to PP and stream 56B which is directed to the $TiCl_4$ separation system. The inlet stream (51A) is cooled to between about 330 and about 365° F., optimally about 355° F. as the condensate contacts the $AlCl_3$. The bottoms (heavy key) stream (54A) of the secondary absorber contains condensed $AlCl_3$, and some gaseous $TiCl_4$ and other trace metal chlorides. Some of the heavy stream is recycled (54B) back to the inlet of the secondary absorber in order to obtain optimal absorption, the remainder is sent to the secondary distillation column (RR).

Still referring to FIG. 5, in the secondary distillation column the heavier and thus higher boiling $AlCl_3$ is removed in the bottoms stream (59) and the partial reboiler (UU) is maintained at approximately about 390 to about 430° F., optimally about 410° F. Stream 60A is boiled back to the column according to the required column vapor rate. The remaining bottoms (60B) is purified $AlCl_3$. This purified stream of $AlCl_3$ is then condensed to solid $AlCl_3$ and collected from line 61 and sent to the Aluminum cell room. The distillate stream 57 is passed through condenser SS which maintains a temperature between about 280 and about 330° F., optimally about 300° F. The condensate (58) then goes to the reflux drum (TT) holding vessel where it is split according to the reflux rate by recycling some to the secondary distillation column (58A) and feeding the remainder (58B and 58C) to the $TiCl_4$ separation system and the primary absorber, respectively. Stream 47B comes from the sub-condenser (KK) in the primary separation system (FIG. 4). The second stage separation system is maintained at a pressure greater than that at which $AlCl_3$ would desublimate at any of the temperatures between about 280 and about 430° F. Preferably, pressure is maintained above atmospheric pressure and about 60 psig, more preferably between about 20 psig and about 40 psig, most preferably between about 25 psig and about 35 psig.

Figure 6:
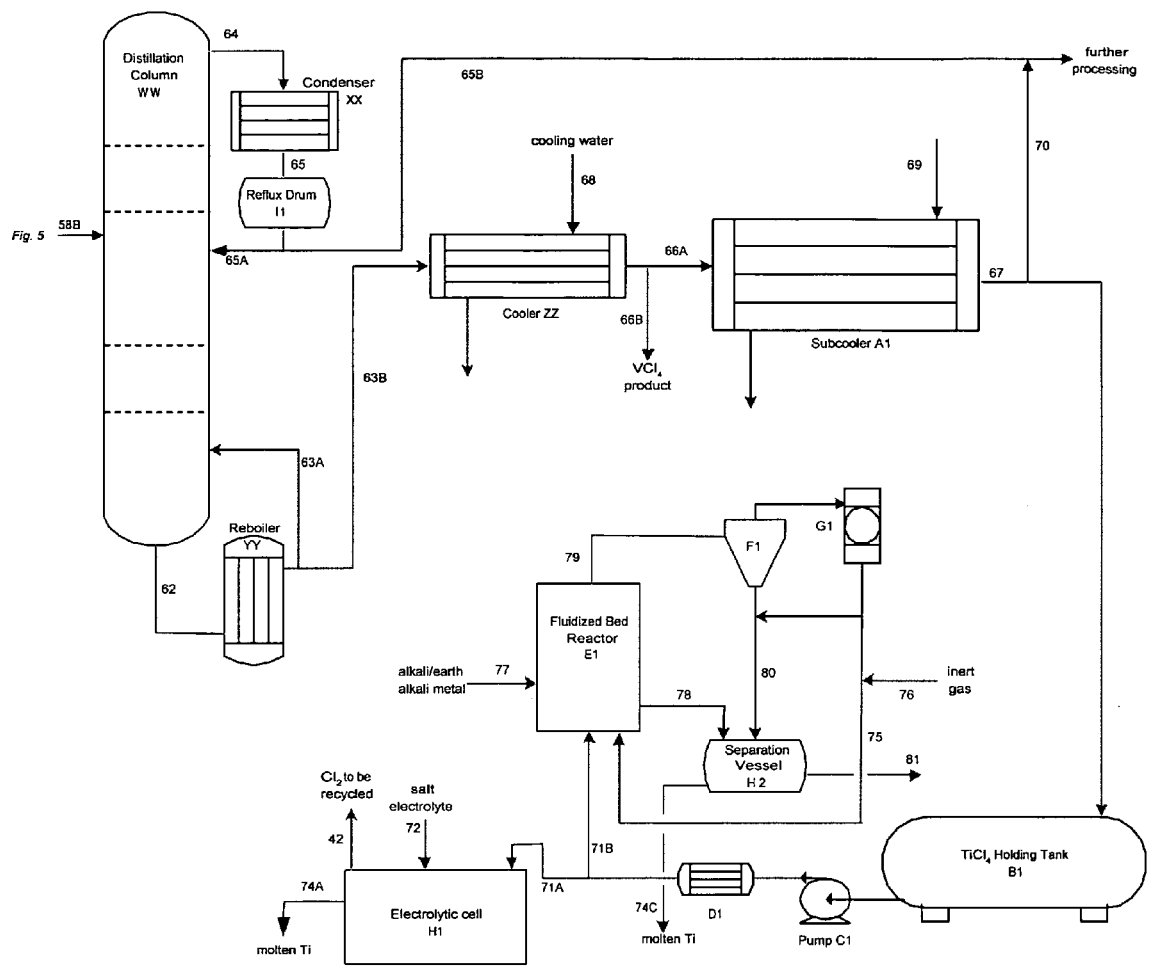
FIG. 6 is an exemplary plant diagram illustrating the $TiCl_4$ separation system and the titanium production system.

Referring to FIG. 6, stream 58B from the secondary distillation column (RR), which contains $TiCl_4$, trace Vanadium compounds, and other non-condensed gases enter the $TiCl_4$ distillation column (WW). The column aids in separating the $TiCl_4$ from the non-condensed gases, any Vanadyl Chloride ($VOCl_3$), and any Vanadium Tetrachloride ($VCl_4$). The Vanadium compounds form and accumulate in the chlorinator from trace Vanadium oxides in the ash reacting with chlorine and liberated oxygen or water. Because the $TiCl_4$'s boiling point is higher than that of $VOCl_3$, it exits column WW in the bottoms stream (62) and the $VOCl_3$ exits with the non-condensed gases as the distillate (64). The distillate enters condenser XX and is condensed and cooled to between about 155 and about 165° F., optimally about 160° F. The condensate (65) goes to reflux drum I1 where it is either sent back to the column (65A) according to the reflux rate or sent (65B) for further processing. The bottoms stream (62) enters reboiler YY where the $TiCl_4$ is boiled and heated to 295 to 310° F., optimally 300° F. The vapor (63A) returns to the column according to the required vapor rate and the liquid (63B) is sent to condenser ZZ where the temperature is reduced to about 275-290° F. The condensate (66B), which is primarily $VCl_4$ will be collected for further purification. The non-condensed gases (66A) then enter subcooler A1 where the temperature is reduced to below 0° F. All $TiCl_4$ will be condensed and sent via line 67 to the Titanium production facility. The non-condensed gases (70) will join stream 65B for further processing. Condenser ZZ is cooled by cooling water (stream 68) and the subcooler A1 is cooled by a continuous refrigeration loop (stream 69). Preferably, the $TiCl_4$ purification system is maintained above atmospheric pressure and 40 psig, more preferably above atmospheric pressure and about 20 psig and most preferably between atmospheric pressure and about 17 psig for optimal operation.

Still referring to FIG. 6, for the electrolytic reduction process, $TiCl_4$ from holding tank B1 is pumped through heat exchanger D1 using pump C1 to the cells via line 71A. The $TiCl_4$ is dissolved in a molten salt electrolyte delivered through line 72 and electrolyzed to molten Titanium at the cathode. The chlorine produced at the anode is removed from the cell by vacuum and recycled back to the chlorinator via line 42 (see also FIG. 3). The molten Titanium is collected from the cell via line 74A and frozen into ingots or slabs. This process can be run continuously to maximize efficiency. This process is called the Ginatta Method.

Still referring to FIG. 6, a second continuous process for the reduction of $TiCl_4$ with a reducing agent such as an alkali metal or an earth alkali metal is carried out in a fluidized bed reactor (E1). The reducing agent is charged through line 77 within a vertical reactor and is fluidized with an inert gas delivered through 75, supplemented with additional inert gas from line 76 and then reacted with $TiCl_4$ to yield titanium powder and an alkali chloride or a earth alkali chloride exiting through stream 79. The bed can be preheated before $TiCl_4$ vapor is introduced into the reactor and the heat of reaction drives the temperature towards the melting point of the alkali chloride or earth alkali chloride. To prevent the reducing agent from melting, a temperature control system can be in place, such as including a steam or coolant jacket. Once fluidized and reacted, the effluent (79) is separated in a unit F1 comprising a cyclone with optional filter and fed via line 80 to separation vessel H2. Molten titanium may also be removed from the reactor via stream 78 directly into H2. This vessel separates molten titanium through line 74C from the stream alkali metal chloride or earth alkali metal chloride and any unreacted reducing agent, which are removed via line 81. The titanium may then be sent for further purification if required. The chloride is then separated in its own electrolytic cell and then recycled back to the chlorinator. Chlorine produced in this cell is returned to the chlorinator. U.S. Pat. No. 6,955,703 discloses a similar process and is hereby incorporated in its entirety by reference.

Another method to obtain titanium from titanium chlorides is the chemical reduction by either molten magnesium or sodium. The magnesium process, called the Kroll process is carried out in a stainless steel retort pot. Excess magnesium is heated before the liquid $TiCl_4$ is slowly fed in. The reaction of magnesium to magnesium chloride and $TiCl_4$ to Ti is carried out as a batch process over several days. As the reaction proceeds, $MgCl_2$ is periodically removed from the retort. After the reaction is complete, the Ti is removed as a "sponge" or porous metal. The sponge is then melted in a vacuum arc furnace and cooled several times in an attempt to remove all impurities. The $MgCl_2$ salt is passed through an electrolytic cell producing molten magnesium and chlorine. The magnesium is sent back to the titanium reactor and the chlorine is sent to the chlorinator. This batch chemical reduction process may also be carried out using metallic sodium. This is known as the Hunter process and is similar to the Kroll process but substitutes sodium for magnesium. The Kroll and Hunter processes are both carried out in a batch system and include the extraction of the titanium sponge from the reaction vessel.

Current methods for the production of aluminum chloride ($AlCl_3$) are the chlorination of bauxite (ore containing $Al_2O_3$) and of pure aluminum. $AlCl_3$ cells have been successfully run but were deemed uneconomic because of the high cost to produce $AlCl_3$. This electrolysis process consumes less than half the electrical power than the currently used Hall-Heroult process. The Hall-Heroult process uses approximately 6.35-7.25 kwh/lb of aluminum produced at 3.0-4.0 volts. An aluminum smelting plant producing 100 tons of Al per day uses 1270-1450 MWhrs. The $AlCl_3$ electrolysis process uses approximately 2.88 kwh/lb of aluminum produced at 1.8 volts. To electrolytically produce 100 tons of Al per day would use 576 MWhrs.

The process for producing Aluminum via the electrolysis of $AlCl_3$ can be performed as follows:

Referring to FIG. 5, anhydrous $AlCl_3$ can be conveyed from its separation process to the electrolytic cell room VV1 via line 61. From the duct pipes, the solids are distributed to the individual cell's feed tanks. Each tank is vented to a scrubber system to prevent over pressurization. The scrubber fans maintain a slight vacuum on each feed tank and are also used to scrub chlorine, if necessary, when starting up the cells. The tanks are located above the cells to allow for gravity feeding. The $AlCl_3$ is fed to the cells using a rotary valve which also isolates the feed tanks from any gas in the feed lines. The $AlCl_3$ flows downward and is pressurized by anhydrous chlorine gas which is added to overcome the hydrostatic pressure of the molten salt electrolyte in the cells. The chlorine distributes the $AlCl_3$ into the molten salt electrolyte for rapid dissolution.

Still referring to FIG. 5, the $AlCl_3$ electrolytic cell VV1 is to be constructed of a carbon steel shell with a complete refractory lining made of thermally insulating brick or oxysilicon nitride, which is able to withstand the chlorine and salt atmosphere. Each cell is insulated with high temperature thermal insulation to minimize heat loss and maintain the cell temperatures. Within the cell is a lower sump to collect the molten aluminum produced at the cathodes. In the upper zone of the cell there is a molten salt bath reservoir, which is continuously replenished with $AlCl_3$. The cell lid contains three ports, one for feeding $AlCl_3$ into the cell reservoir via line 61, one for venting the produced chlorine via line 42A, and the third line 61A for a dip tube which extends down into the bottom of the lower aluminum metal sump. The dip tube is used to remove molten aluminum from the cell. It is also possible to allow the molten aluminum to flow from the bottom of the lower sump into a decanter to separate the aluminum from any entrained electrolyte. The aluminum would then be fed to a storage tank and the electrolyte would be pumped or pressure fed back to the cell. Below the reservoir is an upper terminal anode, several bipolar electrodes, and a lower terminal cathode, all constructed of graphite. The electrodes are arranged in a superimposed manor. Each inter-electrode space is bounded by an upper surface of one electrode (which functions as an anode surface) opposite a lower surface of another electrode (which functions as a cathode surface). The current, anode surface area, and voltage combine into an equation referred to as a k-factor equation. The lower the k-factor, the closer a cell is to running 100% efficient. The smaller the anode-cathode distance the more efficient the cell. The electrolyte bath fills all unoccupied space of the cell and as the bath passes in between the electrodes and comes in contact with the electric current aluminum metal forms at the cathode and chlorine gas forms at the anode. The chlorine gas evolved at the anode is buoyant and its movement is employed to effect bath circulation, while aluminum is swept by the moving bath from the cathode surfaces and settles out from the out flowing bath. Electricity flows to and between the cells via buss bar and within the cells from cathode to anode through the electrolyte. Current densities range from 5-15 amps/in2 of anode surface area.

The molten salt electrolyte must consist of at least 50% Sodium Chloride (NaCl) and 40% Lithium Chloride (LiCl). The remainder must consist of at least 5% $AlCl_3$ and each less than 1% Potassium Chloride (KCl), Magnesium Chloride ($MgCl_2$), and Calcium Chloride ($CaCl_2$). This electrolyte bath can be maintained at temperatures between about 1220 and about 1316° F.

The following example is illustrative of the present invention, and is not to be construed as limiting the scope of the invention. Variations and equivalents of this example will be apparent to those of skill in the art in light of the present disclosure, the drawings and the claims herein.

EXAMPLE

Figure 7:
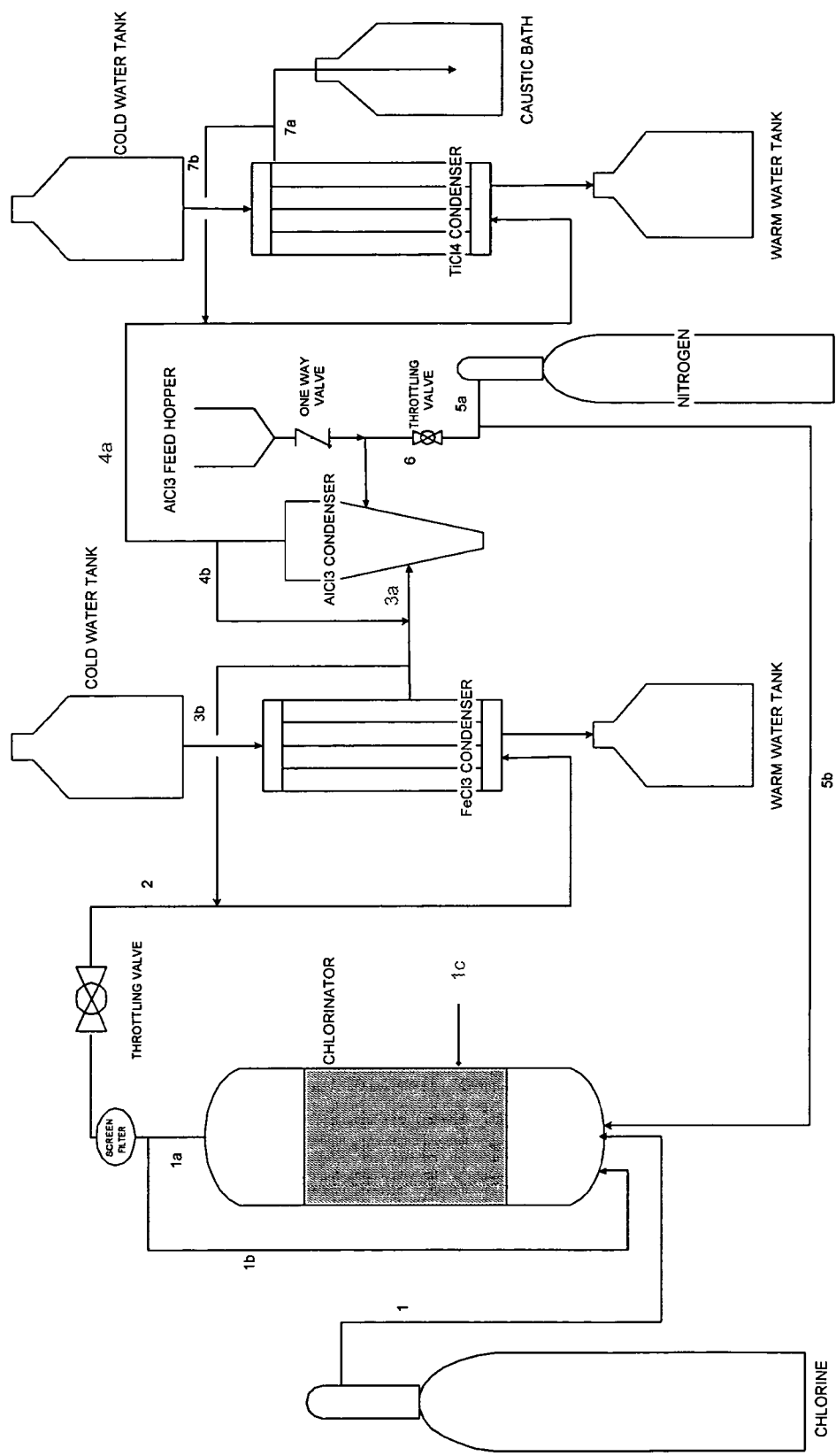
FIG. 7 is a diagram illustrating a bench scale experiment of the chlorination and separation process.

A known amount of coal mine waste was ground into a coarse powder and placed in a temperature controlled electric furnace. The temperature was then increased to between 1550 and 1650° F. and maintained until the material reached that temperature. In FIG. 7, after being held at high temperature for several hours, the coal mine waste is fed via line 1c into the chlorinator along with virgin coal (previously ground into a coarse powder). At the same time, chlorine via line 1 from the chlorine cylinder and nitrogen via line 5b from the nitrogen cylinder is sparged into the chlorinator. The purpose of the nitrogen is to aid in bed fluidization. As the chlorine reacts with the oxides in the calcined coal mine waste oxygen is liberated and combusts the virgin coal (carbon) reducing agent. The temperature within the stainless steel chlorinator increases towards 1850° F. and the gases, liquids and fluidized unreacted solids flow out the top (stream 1a). A small portion of the reactor effluent is recycled (1b) to the bottom of the chlorinator in order to obtain an optimal reaction. The reactor effluent (1a) passes through a screen to emulate a solid removal operation and a throttling valve which is used to control the pressure of the system. Upon starting the system the throttling valve is set at 50% open. As the valve is opened the pressure of the system decreases and the gases in the reactor effluent begin to expand and cool, which reduces the cooling duty of the $FeCl_3$ condenser.

After passing through the throttling valve, stream 2 enters the bottom of the $FeCl_3$ condenser and is cooled by water flowing through internal coils. The water flowing through the coils controls the temperature of the condenser is maintained at approximately 400° F. At that temperature the $FeCl_3$ in the gas stream is condensed and falls to the bottom of the condenser. A small portion of the condenser discharge is recycled (3b) back to the inlet which aids in cooling. The majority of the discharge (3a) then enters the $AlCl_3$ condenser where the temperature is reduced to approximately 350° F., depending on the pressure of the system. This is accomplished by contact condensing warm $AlCl_3$ vapor with cold nitrogen/$AlCl_3$ solids and liquid. Solid $AlCl_3$ is loaded in to the feed hopper and is blown into the condenser with nitrogen. The nitrogen line has a throttling valve which helps to keep the system pressure balanced. As the nitrogen/$AlCl_3$ mixture enters the condenser, some of the solids melt, depending on the system pressure. The solid/liquid mixture cools and condenses the gaseous $AlCl_3$ which falls to the bottom of the condenser. The condenser has a cyclone shape and the gases enter tangentially which aids in the separation of any entrained solids. A small portion of the AlCl$_3$ condenser effluent is recycled to its inlet via stream 4b. The remainder of the gas stream (4a) is then sent to the bottom of the TiCl$_4$ condenser which is designed exactly like the FeCl$_3$ condenser. The TiCl$_4$ stream is condensed using flowing tap water and collected at the bottom of the vessel. The remaining gases are scrubbed with a solution of sodium hydroxide to form bleach.

Experimental results are as follows:

Separation:

The Fe concentration in the FeCl$_3$ condenser—88% as Fe

The Na concentration in the FeCl$_3$ condenser—10% as Na

The Al concentration in the FeCl$_3$ condenser—2.4% as Al

The Al concentration in the AlCl$_3$ condenser—99.40% as Al

The Fe concentration in the AlCl$_3$ condenser—0.37% as Fe

The Na concentration in the AlCl$_3$ condenser—0.06% as Na

Titanium was detected in the TiCl$_4$ condenser but quantity could not be determined Yield, based on starting of 1 lb coal mine waste containing 30 wt % aluminum oxides, 3 wt % iron oxides, 1.5 wt % titanium oxide:

0.035 lbs of FeCl$_3$ was detected in the product vessels, which is 85.4% yield 0.48 lbs of AlCl$_3$ was detected in the product vessels, which is 92.5% yield The yield of TiCl$_4$ could not be determined.

The yields do not account for any chlorides that might have reacted but did not condense.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method for preparing at least aluminum chloride from at least one of coal mine waste and coal fired power plant ash, the at least one of coal mine waste and coal fired power plant ash comprising non-combustible material comprising at least aluminum silicate and combustible material, comprising:

(a) introducing fine particles of the at least one of coal mine waste and coal fired power plant ash into a calciner, combusting the combustible material in the calciner in an oxidizing atmosphere to provide heat content and calcining the non-combustible material under temperature conditions sufficient to cause a change in structure of an alumosilicate framework of the noncombustible material by breaking bonds in the alumosilicate framework to cause decomposition to obtain a resulting calcined product comprising metal oxides and without causing fusing of the metal oxides, the metal oxides including at least aluminum oxide; and (b) selectively chlorinating the resulting calcined product of (a) in a fluidized bed chlorinator by carbochlorination in the absence of a catalyst, including introducing (i) the resulting calcined product of (a), (ii) a chlorinating agent comprising a source of chlorine so that chlorine is present in a stoichiometric amount of chlorine based on content of the metal oxides, and (iii) a reducing agent consisting of particles of coal into the fluidized bed chlorinator including an inert gas as a fluidizing media to obtain mixing of the resulting calcined product, the chlorinating agent and the particles of coal after introduction into the fluidized bed chlorinator; the selectively chlorinating including determining a content of oxides in the resulting calcined product and using an amount of a source of chlorine and an amount of coal based upon the determining to thereby form a product gas comprising at least aluminum chloride from the resulting calcined product without substantial formation of non-metal chloride, the without substantial formation of non-metal chloride including formation of less than about 5 wt. % non-metal chloride based on total weight of the metal oxides.

2. The method according to claim 1, further comprising drying the at least one of coal mine waste and coal fired power plant ash prior to introducing into the calciner.

3. The method according to claim 1, wherein the metal oxides include in addition to aluminum oxide at least one oxide of a metal comprising alkaline and earth alkaline metals, main group III with the exception of boron, main group IV with the exception of carbon and silicon, all transition metals, all lanthanides and actinides.

4. The method according to claim 1, wherein the calcining is performed at a temperature between 1500° F. and 1600° F.

5. The method according to claim 1, wherein the calcining includes addition of a heat source.

6. The method according to claim 1, wherein at least two metal chlorides are formed and the method additionally comprises separating the at least two metal chlorides.

7. The method according to claim 6, wherein the separating includes fractional condensation/distillation of the at least two metal chlorides at pressures and temperatures to fractionally separate the at least two metal chlorides.

8. The method according to claim 1, wherein the at least one of coal mine waste and coal fired power plant ash comprises coal mine waste.

9. The method according to claim 1, wherein the at least one of coal mine waste and coal fired power plant ash comprises coal fired power plant ash.

10. The method according to claim 1, wherein the product gas after the selectively chlorinating includes solids and the method further comprises:

removing the solids from the product gas; and separating at least aluminum chloride from the product gas after removing the solids by fractional condensation/distillation.

11. The method according to claim 10, wherein the product gas further includes liquids and the method further comprises removing the liquids after removing the solids and before the separating.

12. The method according to claim 1, wherein excess heat from at least one of the calcining and the selectively chlorinating is used as an energy source.

13. The method according to claim 10, wherein the fractional condensation/distillation includes condensation and distillation of the at least aluminum chloride at pressures between atmospheric and 80 psig.

14. The method for preparing at least aluminum from the at least aluminum chloride and other metal chlorides, comprising preparing the at least aluminum chloride according to the method according to claim 6, and generating at least aluminum from the at least aluminum chloride and other metal chlorides.

15. The method for preparing at least aluminum from at least gaseous aluminum chloride and other metal chlorides, comprising preparing and separating the at least aluminum chloride according to the method according to claim 10, and generating at least aluminum from the at least aluminum chloride and other metal chlorides.

16. The method according to claim 1, wherein without substantial formation of non-metal chloride includes less than about 1 wt. % non-metal chloride based on the total weight of the metal oxides.

17. The method according to claim 1, wherein without substantial formation of non-metal chloride includes no formation of non-metal chloride.

18. The method according to claim 11, wherein the separating is performed in a separating unit at a pressure of between 40 and 80 psig, and a pressure in the fluidized bed chlorinator is higher than a first stage of the separating unit.

* * * * *